Jan. 4, 1972   J. A. M. LEDUC   3,632,497
ELECTROCHEMICAL CELL
Original Filed June 21, 1966    4 Sheets-Sheet 1
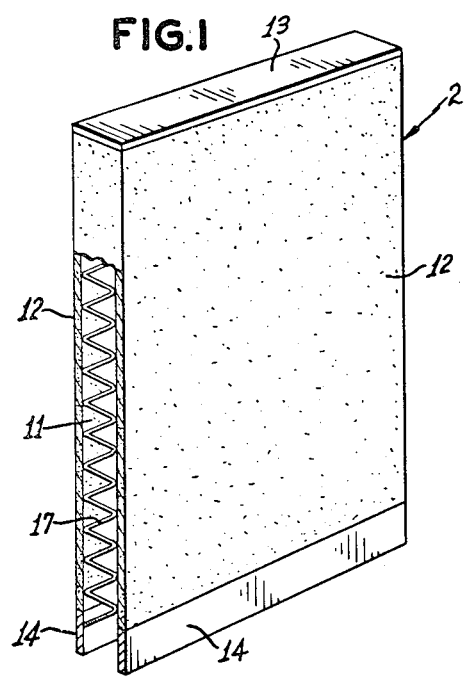
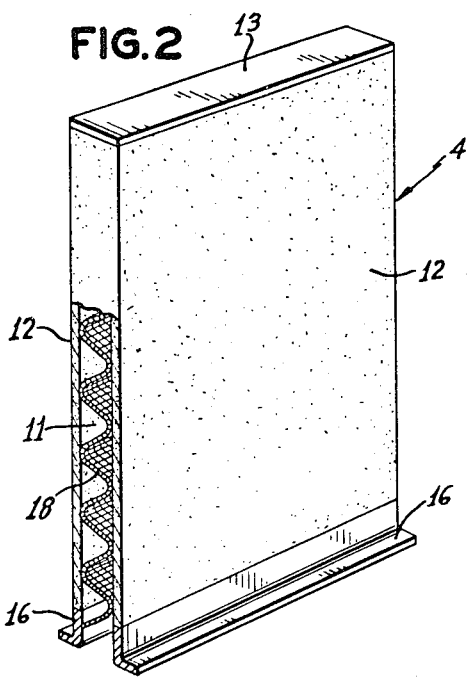
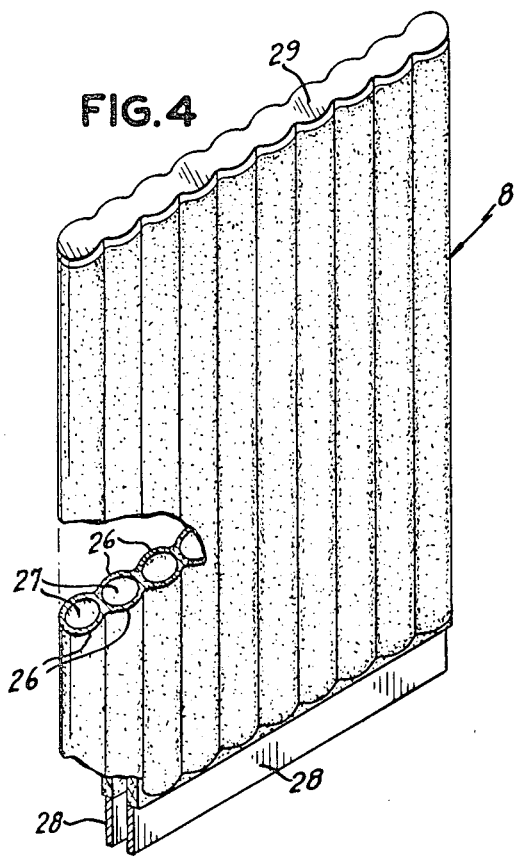
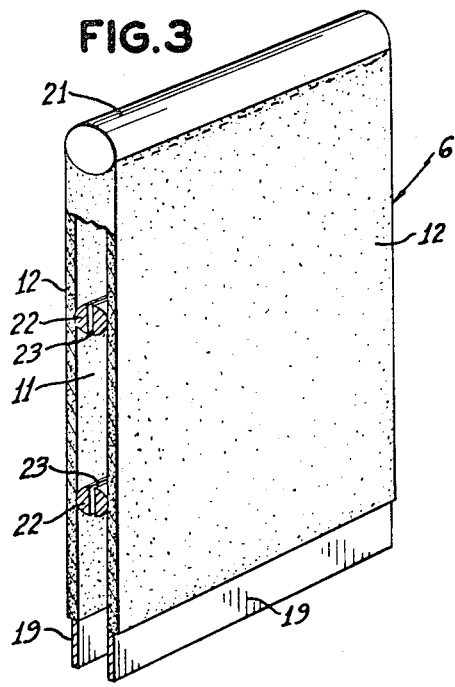
INVENTOR.
Joseph Adrien M. Leduc
BY John C. Quinlan
Marylin Klosty
ATTORNEYS

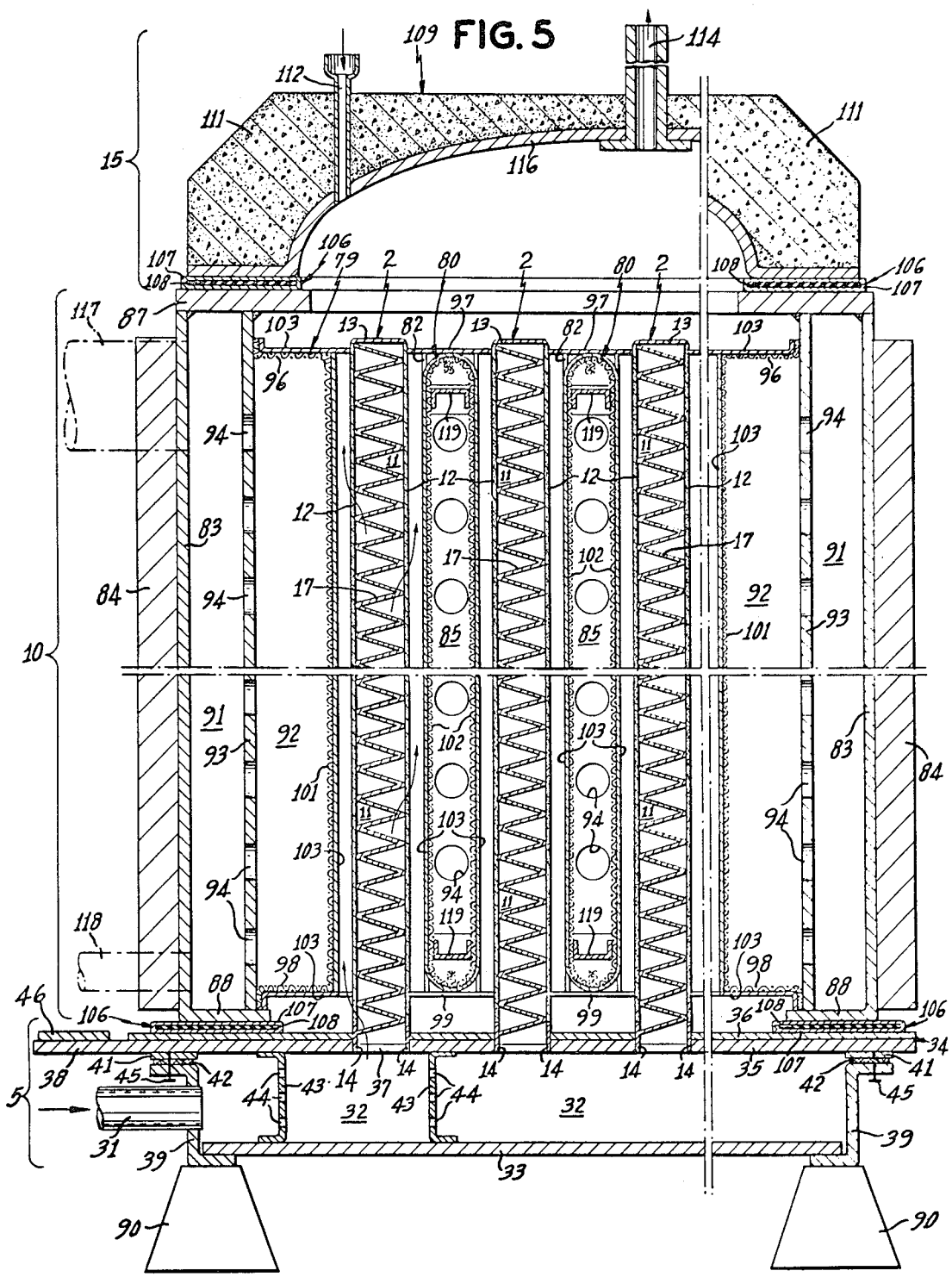

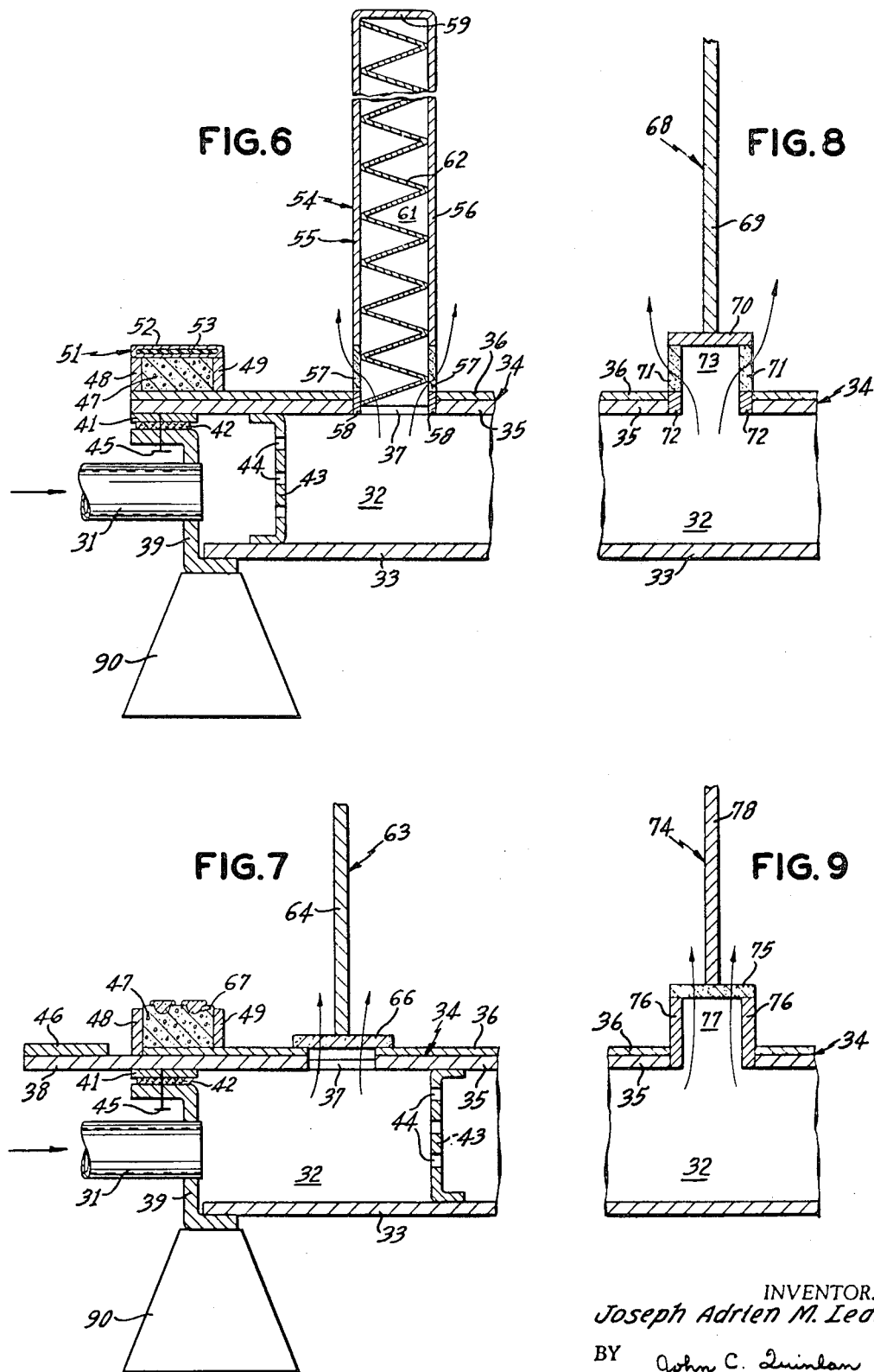

INVENTOR.
Joseph Adrien M. Leduc
BY
John C. Quinlan
Marylin Klosty
ATTORNEYS

United States Patent Office 3,632,497
Patented Jan. 4, 1972

3,632,497
ELECTROCHEMICAL CELL
Joseph Adrien M. LeDuc, Short Hills, N.J., assignor to Pullman Incorporated, Chicago, Ill.
Division of application Ser. No. 559,271, June 21, 1966, now Patent No. 3,379,627, which is a continuation-in-part of applications Ser. No. 224,991, Sept. 20, 1962, now Patent No. 3,288,692, and Ser. No. 299,519, Aug. 2, 1963, now Patent No. 3,342,717. Divided and this application Nov. 22, 1967, Ser. No. 707,900
Int. Cl. B01k 3/04, 3/06; C23b 5/74
U.S. Cl. 204—263                           7 Claims

ABSTRACT OF THE DISCLOSURE

An electrochemical cell having an outer cell casing and an inner cell chamber for containing aqueous electrolyte and within which there is at least one anodic electrode opposed by at least one cathodic electrode, said cell being further provided with inlet means for supplying an aqueous electrolyte medium to said inner cell chamber between the opposing anodic and cathodic electrodes, an anode assembly comprising in combination current distributing means disposed below said inner cell chamber and having thereon a layer of titanium into the inner cell chamber in opposing relationship to said cathodic electrode, said anodic electrode member comprising a reactive anodic surface in the form of a vertical blade formed of titanium and having an outer coating of platinum at least on that portion which opposes the cathodic electrode.

---

This application is a division of my prior and copending application Ser. No. 559,271, filed June 21, 1966, now U.S. Pat. No. 3,379,627. The said application Ser. No. 559,271 is a continuation-in-part of, and was co-pending with, each of my prior applications Ser. No. 224,991, filed Sept. 20, 1962, now U.S. Pat. No. 3,288,692, and Ser. No. 299,519, filed Aug. 2, 1963, now U.S. Pat. No. 3,342,717.

This invention relates to a particular improvement in the manufacture of oxygen-containing derivatives of olefins in an electrochemical cell and to improved apparatus relating thereto. In one aspect the invention relates to an improved method for the manufacture of halohydrin and oxide derivatives of an olefin in an electrochemical cell provided with particular metallic electrodes. In another aspect the invention relates to improved apparatus comprising metallic electrodes and to improved electrode structures particularly useful as the anodic surface of an electrochemical cell in which an olefin is reacted in the anodic region of the cell.

In accordance with my said application Ser. No. 224,-991, an improved method is described and claimed for converting an olefin within an electrochemical cell to the corresponding olefin oxide derivative. The method comprises providing a cell containing an aqueous solution of a metal halide, such as an alkali metal halide or an alkaline earth metal halide, subjecting said aqueous medium to the action of an electrolyzing current, feeding an olefin such as ethylene or propylene to the anodic region of the cell such that the corresponding halohydrin derivative of the olefin is formed, maintaining the flow of aqueous medium from the anodic region towards the cathodic region such that the halohydrin is dehydrohalogenated in the aqueous medium in the vicinity of the cathode to form olefin oxide which is withdrawn from the cell as the principal oxygen-containing derivative of the olefin. The overall principal reaction which takes place in the aqueous medium in the vicinity of the anode is expressed by the following equation in which MX represents an alkali metal halide

represents the reactive ethylenic point of unsaturation of the olefin reactant, and X is halogen corresponding to the halogen of the metal halide:

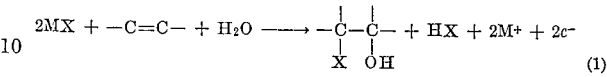

While this halohydrin forming reaction is occurring in the vicinity of the anode, water of the aqueous electrolyte bath is electrolyzed in the vicinity of the cathode to generate hydrogen and hydroxyl anions which cause the aqueous medium in the vicinity of the cathode to become alkaline, according to the following equation:

$$2H_2O + 2e^- \rightarrow 2OH^- + H_2 \qquad (2)$$

By maintaining the flow of aqueous medium within the cell from the anodic region towards the cathodic region, the aqueous medium containing halohydrin is continuously transported to the alkaline medium in the cathodic region wherein the halohydrin is dehydrohalogenated to form the corresponding olefin oxide which is recovered as the product of the process, this reaction occurring as follows:

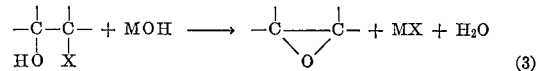

in which M is alkali metal and X is halogen. In order to facilitate the discussion of the present invention, the term "anolyte" as used herein refers to the aqueous electrolyte medium at and in the vicinity of the anode or anodes of the electrolytic cell, i.e., that portion of the aqueous medium in which the formation of halohydrin occurs; and the term "catholyte" refers to the aqueous electrolyte medium at and in the vicinity of the cathode or cathodes of the electrolytic cell, i.e., that portion of the aqueous medium in which the reactions of Equations 2 and 3 occur.

In using anodes composed of graphitic carbon, the power requirement of the electrochemical cell is relatively high and in addition it is found that after prolonged continuous use of the cell, the graphite becomes eroded by olefinic feed resulting in a reduction in the thickness of the anode and widening of the gap between the electrodes thereby causing a further increase in the potential drop in the electrolyte and in the anode itself. A further disadvantage particularly troublesome when the olefin oxide is produced in a diaphragm cell is that during deterioration of the graphite by erosion and by formation of carbon oxides, loose particles of graphite and impregnants usually found in graphitic carbon electrodes cause plugging of the diaphragm. Due to these operational drawbacks and disadvantages of the graphitic anodes, the cell is necessarily operated under a gradually increasing power demand. This requires interruption of the operation of the cell more frequently than is otherwise necessary when a gaseous reactant is not fed to the anode, in order to replace the anodes and the cell diaphragm. One approach to solving the problem of frequency of replacement of graphitic anodes is to use anodes of a relatively thicker cross-section in order to provide an anode of longer life. A major disadvantage of this attempt to solve the problem, however, is that a cell of given geometric dimensions and floor space can be provided with only a lesser number of electrodes and thus the product output of the cell is decreased accordingly. This problem of maximizing product capacity is especially magnified when the olefin reactant is fed to the inner chamber of a porous hollow blade of graphitic carbon such that the olefin reacts at the olefin-electrolyte-anode interface. This type of hollow porous anode is necessarily of a relatively wide cross-section in order to provide adequate mechanical strength but again the product capacity of a cell of given dimensions is decreased since the cell can be equipped with only a fewer number of such hollow electrodes. A further disadvantage in using graphitic carbon anodes of either the solid blade or hollow porous blade type in my process is that a by-product is formed which adheres to the graphitic surface such that the yield of desired oxygen-containing product decreases with time.

Accordingly, it is an object of this invention to provide an improvement in the manufacture of oxygen-containing derivatives of an olefinic compound in an electrochemical cell in which an olefinic compound is reacted in the anolyte.

Another related object is to provide an improvement in said method such that the voltage drop during operation of the cell is substantially decreased.

Another object is to provide an improvement for the manufacture of oxygen-containing derivatives of an olefin by which a relatively constant yield of desired product is obtained during prolonged continuous operation of the cell.

Another object of this invention is to provide an improved electrode particularly useful in an electrochemical cell in which a gaseous olefinic compound is reacted in the vicinity of that electrode.

Another object is to provide such an electrode which has good mechanical strength in the porous state, is not eroded by the olefinic reactant, and is chemically inert to the aqueous reaction medium.

Another object is to provide an electrode of generally increased longevity and decreased cross-section for use as the anode of an electrochemical cell in which an olefin is converted initially to its corresponding halohydrin derivative in the anolyte.

Another object is to provide an electrode having the above properties and which allows for the conversion of an olefin to an oxygen-containing derivative such as halohydrin and oxide derivatives, at a relatively constant voltage which is lower than required when a graphite electrode is utilized.

A further object is to provide an improvement in an electrochemical cell especially useful for the production of olefin oxides.

A further object is to provide an improved base of an electrochemical cell which base is anodic and in which cell a gaseous feed is reacted in the anolyte.

Various other objects and advantages of this invention will become apparent to those skilled in the art from the accompanying description and disclosure.

In accordance with one aspect of the present invention an improved process is provided for producing an oxygen-containing derivative of an olefinic compound which comprises subjecting an aqueous medium having a halide electrolyte dissolved therein and contained in an electrochemical cell to a direct electric current between an anode and a cathode, the anode comprising at least one metal selected from the group consisting of titanium, tantalum, zirconium and niobium and having at least one platinum group metal on the surface thereof, feeding an olefinic compound to the cell such that it is contacted with anolyte, and withdrawing from said cell effluent containing an oxygen-containing derivative of the olefinic reactant as a product of the process. Depending largely on the control of the direction of flow of the aqueous medium within the cell, the halohydrin derivative of the olefin which forms in the anolyte may be recovered as the principal oxygen-containing derivative of the olefin or the halohydrin may be dehydrohalogenated within the cell to form the corresponding olefin oxide which is recovered as the principal oxygen-containing organic product of the process.

The term "platinum group metal" as used herein is intended to include each of the Group VIII metals having an atomic number of at least 44, namely, platinum, palladium, rhodium, iridium, ruthenium, and osmium, as well as alloys thereof such as alloys of these metals with one another. For convenience the following discussion is drawn primarily to a description of the use of platinum as the platinum group metal but it is to be understood that any one of the aforesaid platinum group metals is satisfactorily employed in place of or in addition to platinum without departing from the scope of this invention. The second metallic component of the anodic electrodes described herein, i.e., at least one of titanium, tantalum, zirconium and niobium, is referred to herein as the "substrate metal" by which term is meant any one of these metals either alone or as an alloy such as alloys of these metals with one another. Although the specific discussion of the present invention is primarily directed to titanium, it is to be understood that the present teachings are also intended to cover the use of tantalum, zirconium and niobium in place of or in combination with titanium. Also included within the scope of this invention is the use of electrodes comprising a third type of metallic component, referred to herein as the undercoat, positioned between the substrate metal and platinum group metal. The undercoat may be in the form of: (1) a metallic layer such as a layer of gold, silver or an alloy such as gold-palladium, silver-lead, lead-bismuth, lead-antimony, chromium-silver, chromium-lead, lead-tellurium and lead-selenium alloys with and without the presence of a ternary metal such as the aforesaid alloys in further combination with palladium or rhodium; (2) a binder metal which binds the platinum group metal to the substrate metal by diffusion of the binder metal into both the platinum group metal and substrate; or (3) a pore-filling surface comprising a metal or alloy having good throwing power such that recessed areas on the surface of the substrate are covered with a continuous non-porous film prior to being coated with the platinum group metal.

In the electrochemical manufacture of oxygen-containing derivatives of olefins by my improved method comprising the use of the aforesaid particular metallic electrodes as the anodic surface, the power requirement of the electrochemical cell is less than when the cell is operated under comparable conditions using graphitic anodes. In addition, the process is operable at a substantially constant applied current and the voltage drop during continuous operation is substantially less than when graphitic carbon anodes are employed. It is further found that a relatively constant yield of desired oxygen-containing product is achieved over prolonged periods of continuous operation of the cell provided with the metallic anodic surface. On the other hand, when the cell is operated using graphitic carbon anodes, the yield of oxygen-containing product fluctuates and gradually lessens over prolonged periods of continuous operation. This latter condition is in part attributable to the fact that carbon electrodes are susceptible to deterioration by physical erosion caused by the olefin feed and contact with the aqueous electrolyte bath and by chemical attack of the acidic anolyte. In addition, a graphitic anodic surface also tends to become partially coated with an impurity produced during continuous operation the exact nature of which however is not fully understood. Achievement of a relatively constant yield during continuous operation using the particular metallic electrodes described herein may be explained on the basis that the metallic surface remains intact in the sense that it is not substantially deteriorated by physical erosion, chemical attack and does not tend to become coated with the impurity formed. Further advantages in carrying out my process using the particular metallic electrodes described herein are that a cell of given geometry or volume is capable of producing as much as 50 percent more product than a cell fitted with graphite anodes for reasons which will be discussed in greater detail hereinbelow, and the cell operates at a lower average potential without sacrifice of selectivity of the process in producing desired products.

In accordance with another aspect of this invention an improvement is provided in electrical apparatus comprising the base of an electrochemical cell having the metallic electrodes of this invention secured therein and being further provided with a current distributing plate having tightly fitted thereon a layer of at least one of the aforesaid substrate metals (i.e., titanium, tantalum, zirconium or niobium including alloys thereof), the anodized form of said metal providing the top, exposed surface of the base, the metallic electrodes being in electrical association with the current distributing plate.

In order to facilitate further description and understanding of the teachings of this invention reference is had to FIGS. 1 through 12 of the accompanying drawings.

FIGS. 1, 2, 3 and 4 are three-dimensional views partially cut away of particular structures of the electrodes of this invention.

FIG. 5 is a longitudinal cross-sectional view of an electrochemical cell provided with a particular anode assembly in accordance with one embodiment of the structures of this invention.

FIGS. 6, 7, 8, 9 and 10 are longitudinal cross-sectional views illustrating further embodiments of the anodes and anode assemblies of this invention.

FIGS. 11 and 12 are longitudinal cross-sectional views illustrating the type of cells in which experiments described herein are carried out.

For the purposes of convenience and clarity and to facilitate the description and inspection of the figures of the accompanying drawings, the same reference numerals are used to designate common component parts, chambers and compartments.

Figures 10, 11, 12:
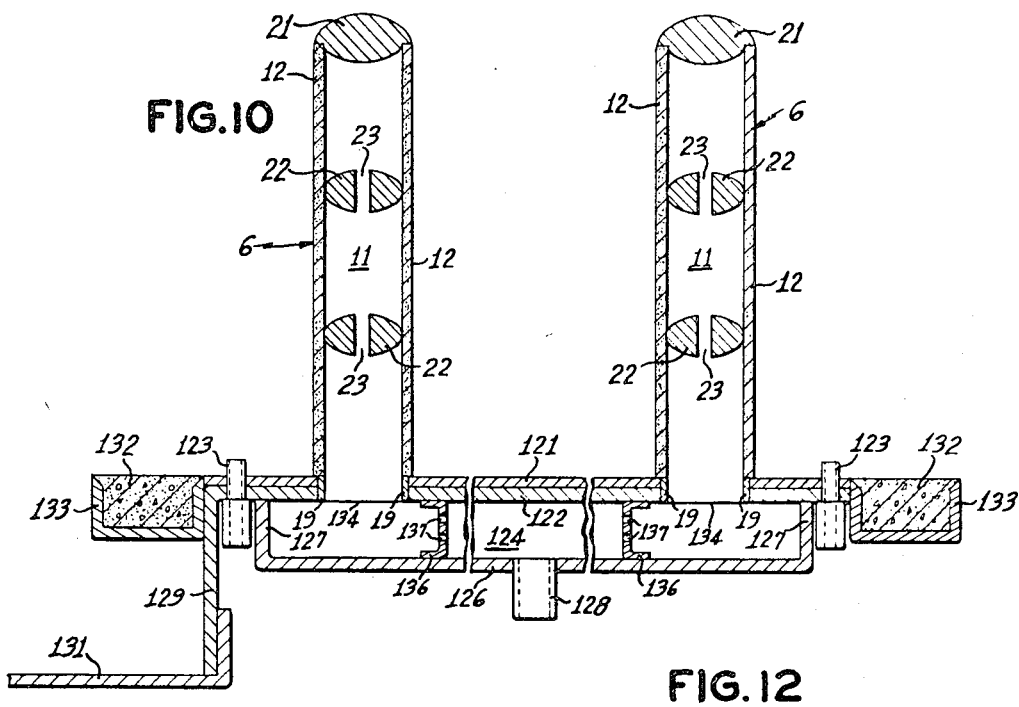

In accordance with the embodiment of the metallic electrodes illustrated by FIGS. 1, 2 and 3, electrodes 2, 4 and 6, respectively, are hollow blades, each comprising inner chamber 11, vertical side walls 12, a base, a top enclosure and an inner support or reinforcement means. The top of electrodes 2 and 4 of FIGS. 1 and 2, respectively, are shown as flat members designated by numeral 13, these electrodes differing with respect to the base and inner support means. Thus base 14 of electrode 2 of FIG. 1 is a strraight vertical member whereas base 16 of electrode 4 of FIG. 2 is L-shaped. The inner support means of electrode 2 is in the form of corrugated strips 17 and that of electrode 4 is in the form of resilient screen 18. Electrode 6 of FIG. 3 differs in that the top enclosure of inner chamber 11 is cylindrical member 21 which may be a rod or tube and the inner support means is also a cylindrical member, designated by numeral 22, and is provided with at least one opening 23 therethrough. Each of the inner support means of the electrodes of FIGS. 1, 2 and 3 is held in place by tack or spot welding, and is preferably composed of a metal which has a relatively low electrical resistance such as stainless steel, copper or one of the aforesaid substrate metals such as titanium. With further reference to FIG. 3, it is noted that base 19 of electrode 6 is of narrower dimension than side walls 12 whereas base 14 of electrode 2 of FIG. 1 is of substantially the same width as side walls 12. The choice of base depends largely on the width of side walls 12 and when sufficiently thick such as from 10 to 60 mils, the base may be of such thinner dimension as shown by FIG. 3 and still be sufficiently strong to withstand the weight of side walls 12.

Vertical side walls 12 of electrodes 2, 4 and 6 are porous and comprise the substrate metal having a layer of the platinum group metal on the exterior surface thereof as well as on the interior surface or surface created by the pores of the substrate. The base and top of the electrodes do not face an opposing electrode surface when assembled in the operating electrochemical cell and, although they may be platinized, these portions of the electrode need not be and for economic, practical reasons are usually not platinized. Thus bases 14, 16 and 19 of electrodes 2, 4 and 6, respectively, and top members 13 and 21 are usually formed of the substrate metal such as titanium and may be in either porous or non-porous form. However, in order to avoid diffusion of the reactant with which the electrode is contacted through a surface which does not face an opposing electrode surface, the base and top members of electrodes 2, 4 and 6 are preferably fluid impervious which state in accomplished either by coating the outer surface, when porous, with a paint such as polytetrafluoroethylene paint, an epoxy resin, molten polymers such as polyethylene, polypropylene, etc., or by forming these portions of the electrode of non-porous metal as shown.

Electrode 8 or FIG. 4 illustrates a self-supporting electrode in the form of a series of contiguous tubes 26 each of which encloses chamber 27. Base 28 of electrode 8, as shown, is similar to that of the base of electrodes 2 and 6 of FIGS. 1 and 3 in that it is a straight vertical member and may be of the same thickness as the walls of tubes 26 or of thinner dimension (as shown), although it is to be understood that the base may also be L-shaped similar to base 16 of electrode 4 of FIG. 2. Since top enclosure 29 of electrode 8 and base 28 also do not face an opposing electrode surface in the operating electrochemical cell, they need not be platinized and are preferably formed of the substrate metal in either fluid permeable or non-porous form as described above in connection with the corresponding portions of electrodes 2, 4 and 6.

As stated above, the electrodes of this invention are especially suitable as the anodes of an electrochemical cell in which a fluid reactant such as an olefinic compound is contacted with the anodic surface. FIG. 5 to which reference is now had, illustrates an electrochemical cell provided with the particular electrode 2 of FIG. 1. As shown, the cell of FIG. 5 comprises lower section 5 in which a plurality of the electrodes of this invention are secured, middle section 10 which comprises the opposing electrode surface, and upper section 15 comprising the cover of the cell. These three units are separable and integral units and are mounted one above the other. Section 5 which is the anode assembly comprises inlet 31, chamber 32, lower base plate 33, and an upper section 34 comprising lower current distributing means shown as plate 35 having metallic layer 36 thereon. Current distributing plate 35 is provided with slots 37 and the lower surface forms the top enclosure of chamber 32. Current distributing plate 35 is formed of an electrolytic grade metal, usually copper, and extends beyond one side of the base such that the extended portion 38 serves as the anode terminal to which anode bus connecting plate 46 is connected. Tightly fitted to current distributing plate 35 such as by cladding, is metallic layer 36 formed of at least one of the aforesaid substrate metals (i.e., titanium, zirconium, tantalum, niobium and alloys thereof). Metallic layer 36 is also slotted, the slots therein being aligned with those in current distributing plate 35. As shown by FIG. 5, base 14 of electrode 2 which is the same as that illustrated by FIG. 1, is fitted within the aligned slots of current distributing plate 35 and substrate metal layer 36 and is held securely in place by welding, the weld also providing a fluid tight seal. Base plate 33 forms the lower enclosure of chamber 32 and is a rigid solid which may or may not be electrically conductive and is usually formed of a ferrous metal such as steel. Side enclosure 39 of chamber 32 may be of a variety of shapes such as S or Z-shaped as shown, U-shaped, I-shaped, etc., such that it is readily secured to connecting plate 41 of upper section 34 of the base and to base plate 33. Although side enclosure 39 is shown provided with at least one inlet 31, it is to be understood that one or more inlets may be positioned within base plate 33 instead of or in addition to inlet 31. A fluid tight seal is provided between side enclosure 39 and upper section 34 of the base by any suitable means such as gasket 42. In view of the fact that chamber 32 is an open chamber additional support is provided by reinforcement brackets 43 having slots 44 therethrough.

In utilizing the electrode assemblies of this invention as the base of an assembled cell, the electrodes extend upwardly therefrom into the middle section of the cell comprising the opposing electrode surface. In carrying out my process utilizing the metallic electrodes of this invention as the anodic surface, the anode assembly such as that designated by numeral 5 of FIG. 5 may be used in combination with any suitable cathodic middle section. When it is desired to convert the olefinic reactant to olefin within the cell, it is especially desirable to operate the process in a diaphragm cell in which the cathodic surface is in association with a liquid permeable diaphragm through which the anolyte containing the halohydrin derivative of the olefin is passed into the alkaline catholyte wherein the halohydrin is dehydrohalogenated to the olefin oxide which is recovered from the cell. One type of cathodic section with which the particular anode assemblies of this invention may be used is that described and claimed in my aforesaid copending application Ser. No. 299,519 filed Aug. 2, 1963 and which is illustrated as section 10 of FIG. 5 herein. As described in the latter application, the cathodic surface is foraminous such as in the form of a screen, as shown, and comprises tubular screen 102 of tubular cathodes 80 having inner support means 119, and vertical screen 101 of half cathodes 79 which are the end electrodes. The inner cell chamber within which the electrodes are positioned and to which the aqueous medium is fed such that it flows between the porous metallic surface of anodes 2 and the foraminous cathodic surface, is defined by vertical walls 101 of each of the two half cathodes 79 and by opposing vertical side walls 82 of which there are two. Each of side walls 82 are also foraminous and are perpendicular to extend between the two end vertical walls 101. Tubular cathodes 80 which enclose cathode compartment 85, and half cathodes 79, extend across the full width of the inner cell chamber between the opposing side walls 82 and are connected thereto by welding or by the removable means described and claimed in my aforesaid application Ser. No. 299,519, such that a continuous foraminous cathodic surface is provided within middle section 10 of the cell. Thus, by this arrangement, electrodes 2 in functioning as the anodes are in opposed, spaced relationship on each of their four vertical sides to a foraminous cathodic surface such that the reactive anodic surface is maximized.

The outer wall of middle unit 10 of the assembled cell of FIG. 5 is casing 83 having current distributing means 84 in contact with the outer surface and has upper and lower flanges 87 and 88, respectively, about the edges thereof. Enclosed between casing 83 and the walls of the inner cell chamber is a peripheral chamber which, as shown, is divided into two compartments, namely, outer compartment 91 and inner compartment 92 separated by vertical wall 93 having openings 94 therethrough. The top and bottom enclosures of outer compartment 91 is defined by upper and lower flanges 87 and 88, respectively. The top enclosure of inner chamber 92 is defined by horizontal foraminous members 96 and 97 which extend, respectively, from wall 93 to the top of each of half cathodes 79 and of vertical side walls 82. The lower enclosure of inner chamber 92 is substantially the same as the top enclosure and is defined by horizontal foraminous members 98 and 99 which extend, respectively, from wall 93 to the bottom of each of half cathodes 79 and of side walls 82.

The various walls of the unit 10 including casing 83, wall 93 and foraminous tubular cathodes 80, foraminous half cathodes 79 and top and bottom foraminous horizontal enclosing members 96, 97, 98 and 99, are secured within this unit and are formed of an electrical conductor such as a metal, usually steel, nickel or stainless steel. Direct current is supplied to current distributing means 84 via a cathode bus. The indicated foraminous surfaces are conveniently in the form of a screen (as shown) although it is to be understood that the term "foraminous" is also intended to include expanded metal sheet, perforated metal sheet as well as porous metal formed from sintered powder. The various foraminous surfaces of the cathodic section are in association with diaphragm 103 formed of any suitable liquid permeable or porous material which is chemically inert to the aqueous electrolyte medium which is circulated between the opposing anodic and cathodic surfaces. Typical examples of suitable materials of which the diaphragm may be formed are asbestos, polyethylene, polypropylene, polytetrafluoroethylene, phenol-formaldehyde polymers and other such materials. These diaphragm materials may be used in woven form and in the form of mats, felts, paper, yarn and bonded fibers. The diaphragm may also be a composite prepared from either a natural or synthetic fiber in any one of the aforesaid forms onto which fiber there is first polymerized a different polymer followed by removal of the original fiber to create capillaries in the original form, the resulting capillaries substantially increasing the permeability and surface area of the final composite.

Top section 15 of the cell of FIG. 5 comprises dome 109 having inlets 112 therethrough and outlet 114. As shown, the dome is made of cement or concrete and is lined with protective layer 116 to avoid erosion of the lower surface. Protective layer 116 may be composed of polytetrafluoroethylene plastic which is laminated or impregnated with glass or asbestos cloth and is bonded to the cement surface of the dome by an epoxy resin. The liner may also be composed of molded polyethylene, polypropylene, etc., of the same contour as the inner surface of the dome, or the dome itself may be of a single mold of polymeric material such as polyethylene, polypropylene, poly-methacrylates, etc.

The three units 5, 10 and 15 are mounted one above the other and are held tightly together by their weight. When the unit cell is designed for smaller product capacity, the sections are held in place by bolts. A liquid and gas tight seal is provided between the units by gasket 106 comprising an inner core 108 formed of asbestos, rubber or other resilient material and an outer layer 107 formed of a synthetic polymer such as polyethylene, polypropylene, polyacrylonitrile, polytetrafluoroethylene and other such materials which are electrical insulators and essentially non-corrosive. When the cell is designed for a relatively large product capacity and is operated at substantially atmospheric pressure usually no further securing means other than the weight of the middle and top units is required. When the cell is operated under a substantial pressure, however, it may be necessary to secure the three units by bolts, clamps or other such pressure securing means. The cell is elevated above floor level and is supported by support legs 90 which are fastened to lower section 5. Support legs 90 are composed of an electrically insulating and non-conductive material such as a ceramic, cement, bricks, etc., or are formed of an electrically conductive material such as steel having an insulator thereon.

In operating cells provided with the platinized metallic electrodes of this invention such as the cell illustrated by FIG. 5, a fluid reactant such as ethylene or popylene is fed to inlet 31 such that the reactant is distributed through chamber 32 within base unit 5. The reactant is confined within base unit 5 such that it flows freely through openings 44 in reinforcement brackets 43 upwardly into inner chamber 11 of each of platinized anodes 2. Aqueous medium containing a dissolved metal halide electrolyte such as any of the alkali metal chlorides for example, is fed to the inner cell chamber by means of inlet 112 within dome 109 such that it flows downwardly between the outer surfaces of the anodes and diaphragm 103 on the foraminous cathodic surfaces which include half cathodes 79, tubular cathodes 80 and side walls 82. A cathode bus connector (not shown) fitted to current distributing means 84 of cathodic unit 10, is connected to the negative pole of a direct current rectifier such as the current flows through current distributing means 84, casing 83, wall 93 and the foraminous surfaces of unit 10. Anode bus connector 46 is tied to the positive pole of a direct current rectifier and the current flows through current distributing plate 35, anodizable metal layer 36 and anodes 2, the base of the anodes being in contact with these two metal layers. The anodizable metal layer 36 composed of at least one of titanium, tantalum, zirconium or niobium constitutes the bottom or floor of the inner cell chamber, and the top surface of the metal is thus in contact with aqueous medium which is fed to the inner cell chamber. As the electrical current flows through anodic current distributing plate 35 during operation of the cell, the surface of the titanium, tantalum, zirconium or niobium of layer 36 which is in direct contact with the aqueous electrolyte medium, is converted in the presence of the aqueous medium to the corresponding metal oxide which is not corroded or eroded by the aqueous medium. In this manner, an adherent, continuous, protective film of metal oxide is formed on the top surface of metal layer 36 thereby avoiding the necessity of coating the floor of the inner cell chamber with a protective layer of an extraneous nature such as epoxy resin as is necessary when the exposed surface of the base is formed of concrete, cement or a ferrous metal. Similarly any unplatinized surface of the substrate metal of base 14 and top member 13 of anodes 2 which may be in direct contact with aqueous medium is also converted to the corresponding metal oxide. The anodization of the unplatinized titanium, tantalum, zirconium or niobium surfaces of the base unit which are in contact with aqueous medium occurs spontaneously when the direct current is applied during operation of the cell as described herein. Alternatively, the conversion of such anodizable metal surfaces to the corresponding oxide may be effected prior to actual operation of the cell by applying a high voltage to the unit until the current ceases to flow. It is to be understood that although those portions of the unplatinized substrate metal surfaces of the anode assemblies described herein which are in direct contact with aqueous medium, are converted to a protective film of metal oxide such as titanium dioxide, the unexposed surfaces remain in the conductive elemental form.

In operating the cell with a metal halide as the dissolved electrolyte while feeding olefin to the anolyte, the direct current is supplied to the cell at a current density of between about 50 and about 500 amperes per square foot of apparent electrode surface. Under these conditions the potential drop across the anode bus and cathode bus is between about 2.8 and about 5.5 volts which under any given set of conditions, is substantially less than the potential drop across the cell provided with anodes formed of carbon.

As the olefinic reactant passes upwardly into the inner anode chambers, it diffuses through the platinized-metal substrate side walls 12 of anodes 2 and reacts at the metal anode-anoylte interface to form the corresponding halohydrin derivative of the olefin in the anoylte. The aqueous medium containing the halohydrin derivative passes through diaphragm 103 on the foraminous cathodic surfaces of tubular cathodes 80 into cathode compartments 85 and also passes through the diaphragm on the peripheral foraminous walls of the inner cell chamber, i.e., end walls 101 of half cathodes 79 and side walls 82, into inner peripheral chamber 92 which, as described above, is enclosed by top foraminous horizontal walls 96 and 97 and lower foraminous horizontal walls 98 and 99. The halohydrin reacts with the alkaline catholyte contained in compartments 85 and 92 to form olefin oxide product. Hydrogen which forms on the cathodic surfaces is confined within cathode compartments 85 and 92 by diaphragm 103 such that it is substantially prevented from passing into the vapor space above the level of the aqueous medium. The catholyte which contains olefin oxide product and cathode gases comprising hydrogen and vapors of olefin oxide product, when sufficiently volatile, pass through openings 94 in wall 93 into outer peripheral chamber 91. The cathode gases exit from chamber 91 by means of upper outlet 117 and the catholyte is withdrawn from the cell by means of outlet 118. Anode gases containing any unreacted olefin, halogenated olefin, water vapor etc., rise through the anolyte and into the vapor space above the level of the aqueous medium and exit from the cell by means of outlet 114 within the dome.

As stated above, lower section 5 of the cell of FIG. 5 is a separate complete unit into which the metallic electrodes of this invention are fitted and, although lower section 5 is shown provided with particular electrodes 2 of FIG. 1, it is to be understood that lower section 5 may also be provided with electrodes 4, 6 and 8 of FIGS. 2, 3 and 4, respectively, in place of electrode 2. For example, in fitting electrode 4 of FIG. 2 in lower section 5 of FIG. 5, L-shaped base 16 of electrode 4 is also fitted within the slotted double metallic layer 34 such that the horizontal portion of base 16 is secured to the lower surface of current distributing plate 35. This latter arrangement provides additional support for the electrode and is especially useful when the porous side walls are of relatively thin dimension, Similarly base 19 and base 28 of electrodes 6 and 8 of FIGS. 3 and 4, respectively, may be slipped into slots 37 in double metallic layer 34 and fixed in place by welding. Although side walls 12 of electrodes 2, 4 and 6 and side walls 26 of electrode 8 are porous above the base portion, it is to be understood that only a portion of the side walls of the hollow blade type of anode need be porous as illustrated by electrode 54 of FIG. 6 to which reference is now had.

Electrode 54 of FIG. 6 is in the form of a hollow blade comprising inner support means 62 and inner chamber 61 which is enclosed by top enclosure 59 and vertical side walls 55. The latter are sectioned into a non-porous base 58 and non-porous upper section 56 with porous section 57 therebetween. Side walls 55 and top enclosure 59 are formed of one of the substrate metals, e.g., titanium, and although the entire hollow blade may be platinized, it is only necessary to platinize the surface of the substrate metal which is exposed to the aqueous medium and opposed by a cathodic surface during operation in an assembled cell such as section 56, as well as any portion of porous section 57 which may oppose a cathodic surface in order to maximize the reactive anodic surface area. Top enclosure 59 is as described above with reference to top enclosure 13 of electrode 2 of FIGS. 1 and 5. Electrode 54 of FIG. 6 is shown fitted within a base which is the same as section 5 of FIG. 5 except that it is provided with an insulating layer 47 above and about the periphery of anodizable metal layer 36. Layer 47 is composed of an electrically insulating and non-conductive material which is suitably cement, plastic, glass, etc., and is held between vertical members 48 and 49 which together with the upper surface of the end portion of anodizable metal layer 36 form a pan-shaped container. Outer vertical member 48 may be formed of any rigid solid such as steel and may be an integral part of connecting plate 41 to form an L-shaped member which is provided on one side with an opening through which current distributing plate 35 may extend, an anode bus being connected to the extended portion such as illustrated by FIG. 5. Inner side member 49 is formed of at least one of titanium, tantalum, zirconium or niobium and is also anodized either prior to or during operation of the cell, such that a non-corrosive film of the corresponding oxide forms thereon to provide a protective surface continuous with the metal oxide which also form on metal layer 36. The top surface of insulating layer 47 is provided with gasket 51 having inner core 53 surrounded by layer 52 as described above in connection with gasket 106 of FIG. 5, upon which any suitable cathodic unit may be mounted such as unit 10 of FIG. 5. In such a cell, olefin reactant is fed to inlet 31 of the base of the cell such that the olefin flows freely through chamber 32 and upwardly into the inner chamber 61 of electrodes 54 which function as the anodic electrode. In view of the fact that only a portion of side walls 55 is porous, the olefin passes through only porous section 57 and passes upwardly through the anolyte wherein it is converted to halohydrin. The operation of a cell provided with the anode assembly of FIG. 6 is otherwise the same as described above with respect to FIG. 5.

Although the anodic electrodes of FIGS. 1-6 are in the form of hollow blades such that the olefin reactant is fed to the inner chambers thereof, it is to be understood that the particular electrodes used in carrying out my process may comprise a solid, non-porous blade as illustrated by FIGS. 7, 8, and 9. Each of electrodes 63, 68 and 74 of these figures comprises blade 64, 69 and 78, respectively, formed of a core of the substrate metal such as titanium, having at least one of the aforesaid platinum group metals as a continuous coating on the surface thereof. In each instance, the platinized-titanium blade is perpendicular to and extends upwardly from a base or supporting means which is preferably formed of one of the substrate metals. Usually at least a portion of the support for the solid, non-porous blade is porous such that it may also function as the means by which the olefinic reactant is fed into the anolyte. For example, the base of electrode 63 of FIG. 7 is horizontal plate 66 which is fitted directly to the top surface of anodizable metal layer 36 and over slots 37 in layers 36 and 35 which are as above described. In this manner, olefin reactant passes from chamber 32 through porous surface 66 and upwardly along the outer surface of blade 64. The other members of FIG. 7 are as described above in connection with FIG. 5 except that the base is provided with a peripheral insulating layer 47 as described above in connection with FIG. 6 with the further modification that insulating layer 47 is provided with O-ring seals 67 formed of a fluid impervious material to furnish a fluid tight seal between the base and cathodic unit mounted thereon. For example, seals 67 may be formed of asbestos or glass fiber (in the form of rope, cloth or sheet) impregnated or laminated with polytetrafluoroethylene plastic, phenol-formaldehyde resins, etc., or the seals may be formed of a resilient center of asbestos, rubber or resins, covered with a continuous thin sleeve of material which is not attacked by the aqueous medium of the cell such as polyethylene, polypropylene, polyacrylonitrile and the like.

The base of electrode 68 of FIG. 8 is different from that of FIG. 7 in that horizontal plate 70 to which blade 69 is secured is elevated above double metallic layer 34 by vertical members 71 which are in electrical association with current distributing plate 35 and substrate metal layer 36 by means of members 72. Since blade 69 is the reactive anodic surface only it need be platinized and the support means including 70, 71 and 72 which are formed of one of the substrate metals such as titanium need not be platinized. One or both of 70 and 71 which enclose chamber 73 may be porous and, as shown, only vertical members 71 are porous. The support means of electrode 74 of FIG. 9 is the same as that shown by FIG. 8 except that horizontal plate 75 is porous whereas vertical members 76 are non-porous. The remainder of the anodic unit of FIGS. 8 and 9 may be as shown by FIGS. 5, 6 or 7 and, in each case, the olefinic reactant which is fed to chamber 32 from an external source passes therefrom into smaller chambers 73 and 77, respectively, of FIGS. 8 and 9, through respective porous metallic members 71 and 75, directly into the anolyte wherein the olefin reacts along the platinized titanium surface of anodic blades 69 and 78.

It is to be understood with reference to electrodes 63, 68 and 74 of FIGS. 7, 8 and 9 respectively, that although the respective supporting means of the solid anodic blades need not be platinized, any portion thereof may be coated with the platinum group metals without departing from the scope of this invention. When not platinized, the outer surfaces of the supporting means which are in direct contact with the aqueous electrolyte medium are readily converted to a coating of the oxide of the substrate metal of which they are formed such as titanium oxide, either prior to or during operation of the cell.

It is to be understood that various other modifications of the anodic sections illustrated by FIGS. 5-9 may be made without departing from the scope of this invention. For example, although FIG. 5 shows introduction of the aqueous medium to the cell by means of inlets 112 positioned within the dome the aqueous medium may be fed to the cell by means of inlets positioned within the base of the cell. This latter embodiment is illustrated by accompanying FIG. 10.

The anode assembly of FIG. 10 comprises electrode 6 described above with reference to FIG. 3, current distributing plate 122 having substrate metal layer 121 thereon, each of the latter having aligned slots 134 therethrough, inlets 123 which extend upwardly through the two layers of metal, and chamber 124 enclosed by base plate 126 and side walls 127. As shown, base plate 126 is provided with at least one inlet 128 by means of which the olefinic reactant which is to be contacted with electrode 6 is fed to chamber 124, although it is to be understood that such inlet may also be positioned within side walls 127. Inlets 123 are also formed of one of the substrate metals such as titanium, such that a continuous surface of such metal exists between these inlets and metal layer 121 and are the means by which the aqueous electrolyte medium is fed to the cell. Inasmuch as inlets 123 are also in contact with current distributing means 122 they are anodic and, since they are exposed to aqueous medium during operation of the cell, the exposed surface of the substrate metal, i.e., titanium, tantalum, zirconium or niobium, is converted to corresponding metal oxide as is the exposed surface of layer 121 such that a continuous surface of the non-corrosive metal oxide such as titanium oxide, is provided. This anode assembly is also provided with a peripheral insulating layer 132 contained within pan-shaped member 133 which is usually formed of steel. As shown, current distributing plate 122 extends downwardly at one side and extension 129 thereof serves as the anode terminal. Extension 129 is connected to anode bus connector 131 which in turn is connected to the positive pole of a direct current rectifier.

As illustrated by the electrode structures of the above discussed FIGS. 1-9, the anodic electrodes of this invention may be in the form of a solid blade, i.e., a non-porous blade, such as those designated by numerals 64, 69 and 78 of FIGS. 7, 8 and 9, respectively, or at least a portion of the electrode may be porous as in the case of the hollow blades illustrated by FIGS. 1-6. In either case, the reactive surface of the electrode is formed of one of the substrate metals such as titanium having a continuous layer of platinum group metal on the external, visible surface as well as on the internal surface contributed by any porous area. It is to be understood that the term "reactive surface" as used herein in describing the anodic electrodes of this invention refers to that portion of the electrode which opposes a cathodic surface during its use as described herein.

The platinum group metal may be applied to the substrate metal by a variety of techniques such as coating the surface of the substrate metal with a salt of the platinum group metal followed by firing to decompose the salt to elemental metal; chemical and electroless plating; electrodeposition including electroplating and brush or pad-wheel electroplating; vacuum deposition; as well as mechanical bonding methods such as cladding or lamination techniques. The particular method employed depends on the physical state of the substrate initially as well as on the desired physical state of the final reactive surface of the electrode, that is, porous, non-porous or various degrees of porous surface areas on a solid metal core.

When used in porous form, the substrate metal may be prepared by sintering of the metal in powder form in an inert atmosphere or under vacuum at an elevated temperature such as about 800–1500° C. The substrate may also be prepared in porous form from a knitted mesh (as opposed to woven screen) formed of about 1–3 mils diameter wire of the substrate metal which mesh is compressed in a mold into a matrix of controlled porosity, followed by sintering at an elevated temperature; the sintered matrix of wire is then preconditioned and coated with the platinum group metal as described herein. Another similar matrix of the substrate may be formed by compressing in a mold several layers of fine screens formed of the substrate metal such as titanium and the compact or compressed composite is then sintered at an elevated temperature and subsequently coated with the platinum group metal. Suitable properties of porous titanium, for example, for use in the manufacture of the porous electrodes described herein are given in the following Table I:

TABLE I.—PROPERTIES OF POROUS TITANIUM MATRIX

| | |
|---|---|
| Porosity, percent | 5–70 |
| Pore peak, microns | 0.1–50 |
| Bubble pressure in water, p.s.i. | 2–16 |
| Permeability, millidarcies | 10–500 |
| Resistivity, micro-ohm-cm. | 4–280 |

A particularly preferred form of porous titanium is that having the following combination of the above properties: a porosity of 15–40 percent; a bubble pressure in water of from 1.8 to 5.4 p.s.i.; a permeability of from 100 to 150 millidarcies and a resistivity of from 200 to 280 micro-ohm-cm.

In combining the platinum group metal with the substrate in either porous or non-porous form, the surface of the substrate is subjected to preliminary conditioning to free it of grease, and otherwise wash it such as by degreasing with an organic solvent such as carbon tetrachloride and trichloroethylene. The degreasing of fine porosity titanium frequently requires further treatment such as continuous vapor degreasing with trichloroethylene, for example, by which the porous substrate is exposed to vapors above a refluxing bath of degreasing agent. The surface of the substrate onto which the precious group metal is to be deposited is further treated to ensure removal of any highly resistive metal oxide or carbonate which may be present on the surface, by electrical or chemical etching. Chemical etching is accomplished by treating the substrate in an acid bath such as hydrofluoric acid, nitric acid or hydrochloric acid or mixtures thereof. Electroetching is usually carried out in media such as hydrochloric acid, oxalic acid, citric acid, hydrofluoric acid alone or in combination with ammonium fluoride, sulfur-containing acids such as sulfuric, sulfonic, and sulfamic acids, or in molten media of alkali metal compounds such as sodium hydroxide, sodium chloride, sodium fluoride, etc. It is preferred to etch the substrate in a solution which will require minimum subsequent washing with water prior to platinum coating in order to avoid partially oxidizing the substrate surface with oxygen contained in the water. The treating solutions are circulated through any portion of the substrate which is porous and which will constitute a reactive surface in the finished electrode so as to provide a freshly exposed surface throughout the area on which the platinum group metal is to be deposited including the surface of any internal pores. The cleaned and etched surface of the substrate is subsequently subjected to any one of a number of methods to deposit the platinum group metal.

It is noted, however, that platinum coating methods produce a porous surface which is dependent on the degree of etching to which the metal substrate is subjected and, since platinum plating baths in general have a fair throwing power, the platinum group metal coating may be of a relatively high degree of porosity especially in the recessed areas of the etched surface. As already disclosed hereinabove, the metallic electrodes described herein may also comprise a third metallic component referred to herein as the undercoat which may be applied to the etched surface of the substrate prior to deposition of the platinum group metal. Thus a uniform layer of the metallic undercoat may be applied either by electrodeposition or by spraying or brushing a metal salt or a mixture of metal salts onto the substrate followed by decomposition of the salt at an elevated temperature to convert the salt to elemental metal. The composite may then be further treated, particularly after the platinum group metal is deposited, at a high temperature to bind the undercoat to both the substrate and platinum group metals by forming an alloy of the undercoat with each metal by diffusion.

A particularly preferred method for depositing the platinum group metal onto the surface of the substrate is electroplating which is accomplished by placing the preconditioned substrate metal as the cathode in a standard electroplating bath containing a salt of the platinum group metal, opposed to an anode formed of platinum, platinized titanium or steel and passing an electric current therethrough. For example, in depositing platinum, suitable electroplating baths are solutions based on platinic chloride, platinum-diammino-dinitrite (known commercially as platinum "P" salt), alkali hydroxy-platinates, nitritoplatinites and platinum-diammino-nitrate. Typical examples of such platinum electroplating solutions are: (1) a solution of platinic chloride in hydrochloric acid; (2) solutions prepared by reacting platinic chloride (e.g., 5 grams per liter) with an excess of a mixture of ammonium and sodium monohydrogen phosphates; (3) solutions obtained by dissolving platinum-diammino-dinitrite in aqueous solutions of concentrated sulfuric, phosphoric or sulfamic acids such as a sulfamic acid solution containing from 8 to 15 grams of platinum metal content derived from the dinitrite salt; (4) solutions of platinum-diammino-dinitrite containing a combination of sodium nitrite and ammonium nitrate or sodium acetate and sodium carbonate; (5) alkaline solutions of hexahydroxy-platinic acid such as those containing sodium and potassium hydroxides or potassium sulfate, the platinic acid in these alkaline solutions being in the form of the corresponding alkali metal hexahydroxy-platinate salt; and (6) a diamminonitrate bath containing 4 to 9 grams of platinum maintained slightly ammoniacal by the addition of ammonium hydroxide. In using these solutions, the plating is effected at a current density between about 10 and about 100 amperes per square foot of electrode surface and the bath is usually maintained at a temperature between about 50 and about 100° C. The metal is usually electroplated at a plating rate of 10–30 milligrams per ampere-minute. For example, the thickness of the metal coating plated at a rate of 1 milligram per square inch is about 3 micro-inches.

Another suitable electrical plating technique is brush plating whereby the substrate metal is made cathodic and a solution of a compound of the platinum group metal is applied thereto by means of a brush or pad. For example, in applying platinum to titanium by this technique, the titanium is made cathodic, the handle of the plating pad is made anodic, and the pad is dipped into the platinum plating solution and applied to the titanium surface with a rubbing action. One advantage of brush plating is that it involves simple equipment and, because of the proximity of the anode to the titanium surface, a more adherent and uniform coating of the platinium is obtained which is especially advantageous when the substrate is of irregular shape. Brush plating is used satisfactorily to coat a solid or non porous surface of the substrate metal and may be used to coat the internal surface of a porous matrix provided the plating is carried out with circulation of the plating solution through the pores.

Another suitable method which may be used in the manufacture of the electrodes of this invention is chemical or electroless plating. This method is satisfactorily employed for the coating of the substrate metal in non porous or porous form. A suitable electroless platinum plating bath is an ammoniacal solution of platinum-diammino-dinitrite containing ethylene-dinitrito-tetra-acetic acid as a chelating agent.

The surface of the substrate may also be coated with the platinum group metal by vacuum deposition. For example, in depositing platinum by this technique, the substrate metal such as titanium as either a solid plate or porous matrix is immersed in and impregnated with a platinum chloride solution or chloroplatinic acid under a sub-atmospheric pressure and the substrate so treated is subjected to an elevated temperature such as between about 500° and about 1000° C. such that the platinum is deposited in finely divided form and dispersed throughout the pores of a porous matrix.

In the case of preparing the reactive anodic surface in porous form, however, it is usually preferred to deposit the platinum group metal by electroplating, brush plating with flow through of solution, or electroless plating as described above. A porous matrix is usually coated by these techniques because they more readily provide a substantially even distribution of the platinum group metal through the pores of the matrix at an amount of platinum just sufficient to completely coat the surface of the matrix, without plugging the pores, and thus allow for the diffusion of the olefinic reactant which is to be brought into contact with the anode during use in the operating cell.

When the surface to be coated is non-porous, in addition to the above techniques, other methods which are suitably employed are immersion coating and brush firing. For example, in accordance with immersion coating and brush firing, the preconditioned surface of titanium is dipped in or brushed with, respectively, a saturated solution of chloroplatinic acid with or without the presence of a reducing agent such as hydrazine, followed by drying to remove the solvent, and firing to decompose the platinum compound to metallic platinum. The procedure of immersing or brushing, drying and firing is repeated until the desired thickness of the platinum coating is obtained. The firing step is carried out above the decomposition temperature of the precursor of the platinum group metal which in the case of chloroplatinic acid is about 500° C.

It is to be understood that in the above described deposition techniques for preparing the reactive surfaces of the anodic elecrodes described herein, in place of the indicated platinum precursor compounds, corresponding compounds of the other platinum group metals may be employed such as palladium-diammino-dinitrite; palladous chloride; sodium chloropalladite; tetra-ammino palladous chloride; ruthenium nitrosyl-chloride; ruthenium sulfamate; ammonium chloro-iridate; rhodium sulfamate; and rhodium sulfate.

Another method by which the non-porous electrodes of this invention may be formed is mechanical bonding which comprises cladding thin foils of the platinum group metal or alloys thereof on the substrate metal.

It is to be understood that although the reactive surface of the anodic electrodes are composed of the substrate metal having a continuous layer of platinum thereon, other portions of the complete electrode as assembled in an operating cell need be composed of the substrate metal only. As described above, the complete hollow blade type electrodes illustrated by FIGS. 1–4, include a top enclosure and a base portion which is secured to the anodic base assembly. In the manufacture of such electrodes, the hollow blade of desired shape is usually first formed of the substrate metal only and those portions such as the top enclosure and base portion which need not be platinized may be masked during the above described techniques for depositing the platinum group metal, so that the latter metal is deposited only on that portion of the substrate which becomes the basis of the reactive anodic surface.

The amount of platinum group metal deposited on the substrate metal is relatively small and is usually just sufficient to be a continuous film on the reactive surface. Generally, the platinum group metal constitutes beween about 0.5 and about 5, more usually between about 0.7 and about 1.0, weight percent of the total weight of the reactive surface of the electrode. The thickness of the platinum group metal layer on the surface of a non-porous substrate is usually between about 5 and about 400 microinches. The thickness of the layer of platinum group metal on the surface of a porous matrix including the surface of the internal pores, varies depending upon the porosity of the substrate and is limited to the extent that the pores are not plugged by metal. The pores of a porous matrix usually have a diameter of between about 0.3 and about 10 microns and a mean port size of between about 3 and about 10 microns and a mean pore size of between about 3 and 4 microns. The thickness of the platinum group metal coating on the porous surface is between about 10 and about 200 micro-inches although a thicker coating may be applied without departing from the scope of this invention. Other properties of the porous electrodes prepared as typically described herein are a porosity of between about 15 and about 40 percent, a bubble pressure of between about 2 and about 10 inches of mercury, and a resistivity of between about 200 and about 280 micro-ohm-cm. These properties of the platinized porous substrate are obtained by proper selection of the matrix which is to be platinized except that the permeability of the structure usually increases by about 20 to 40 percent during preconditioning treatment prior to applying the platinum group metal by the above-described deposition techniques such as electroplating. On the other hand, the resistivity and other properties of the platinized surface are substantially the same as that of the porous substrate metal.

The following examples are offered as a better and further understanding of the teachings of this invention and, since they are intended as typical and illustrative they are not to be construed as unnecessarily limiting thereto. Except as otherwise indicated, the cells in which these specific examples carried out are of the type illustrated by FIGS. 11 and 12 or modified forms thereof.

The cell of FIG. 11 comprises outer vertical wall 140 provided with anode terminus 142 and outer wall 141 provided with cathode terminus 143. These outer walls are separated by sections 147 to which anode 152 is connected, spacers 144, and sections 146 to which the cathodic screen 149 is connected, the various sections 141, 146, 144 and 147 having fluid tight gaskets therebetween. Anode 152 is in association with a fine knitted nickel screen 153 which is crimped to provide a large area of contact and is in contact with a coarse screen 154 of stainless steel which provides pressure against crimped screen 153 to obtain good electrical contact. As illustrated, screen 149 is in association with a fluid permeable diaphragm 151 such as asbestos, polyethylene or polypropylene. The cell is further provided with various inlets and outlets by means of which the olefin and brine feeds are fed to the cell and by means of which anodic and cathodic gases and aqueous medium are withdrawn from the cell. For example, aqueous medium such as an aqueous solution of sodium chloride is fed to the cell from an external source by means of inlet 158, passes through inlet 159 such that it is discharged into anode compartment 163 flowing upwardly between the opposing surfaces of anode 152 and diaphragm 151. Olefinic feed such as ethylene or propylene is fed to the cell by means of inlet 157, passes through foraminous sparge 156 which may be formed of porous polyethylene, porous glass or porous anodized titanium, and flows upwardly into the anolyte contained in anode compartment 163. When the chlorohydrin derivative of the olefin is dehydrochlorinated within the cell, it is necessary to provide for the flow of anolyte through diaphragm 151 into cathode compartment 164 wherein the chlorohydrin is dehydrochlorinated in the alkaline catholyte. This necessary flow is achieved by feeding the aqueous solution to the anode compartment 163 and by withdrawing the catholyte from the cell from cathode compartment 164 by means of outlet 161. When sufficiently volatile under the conditions at which the cell is operated, the oxide such as ethylene oxide or propylene oxide, passes from the cell as cathodic overhead by means of outlet 148, the remainder of the oxide dissolved in the catholyte being withdrawn from the cell by means of outlet 161. Volatile products formed in the anolyte such as dichlorinated derivatives of the olefin, pass from the cell by means of outlet 162, and other cathodic gases such as hydrogen exit from the cell by means of outlet 158.

The cell of FIG. 12 is similar to that of FIG. 11 except that instead of being provided with means by which the olefin is fed through a sparge directly into the anolyte, the cell is provided with olefin inlet 176 by means of which the olefin is fed to chamber 182 enclosed between outer wall 166 and porous anode 172, the latter having anode terminus 173 connected thereto. In this manner, the olefin reacts at the interface of porous anode 172 and the anolyte contained in anode compartment 183, aqueous medium being fed to the anode compartment by means of inlet 177. The anolyte flows through fluid permeable diaphragm 171 in association with cathodic screen 169 having cathode terminus 174, into the cathode chamber 184 between cathodic screen 169 and outer wall 167. Catholyte is withdrawn from the cell by means of outlet 178 and cathodic and anodic gases exit from the cell by means of outlets 179 and 181, respectively. The cathodic and anodic sections of the cell are separated from one another by means of spacers 168 which are formed of any suitable electrically insulating material such as glass, polyethylene and the like. Fluid tight seals are provided between the sections of the walls of the cell by suitable gaskets, and the end portions of cathodic screen 169 are imbedded in an epoxy resin.

When it is desired to recover the halohydrin as such the cells of FIGS. 11 and 12 are modified by positioning between the opposing anodic and cathodic surfaces a substantially fluid impervious barrier such as porous sintered glass or asbestos paper or mats of sufficient thickness to prevent the flow of aqueous medium between the anode and cathode compartments, in place of fluid permeable diaphragms 151 and 171, respectively. Additionally, the cells are further modified to provide an outlet in the anode compartment by means of which anolyte is withdrawn from the respective anode compartments, and the cathode compartments are provided with an inlet by means of which aqueous brine solution may be fed thereto directly from an external source. By these modifications, the halohydrin may be recovered as such from the cell and, in view of the fact that the reaction which occurs in the anolyte is improved by the use of the electrodes described herein as the anodic surface, the method also constitutes an improved method for the manufacture of halohydrins.

EXAMPLE I

Platinization of porous titanium was conducted in an electroplating cell comprising a plastic housing and fitted with vertically mounted electrodes. The anode consisted of platinum in the form of a screen and extended the full height of the interior of the cell. The cathode also extended the height of the cell interior and was formed of a plaque of porous titanium having 20 percent porosity, a permeability of 103 millidarcies and a resistivity of 269 micro-ohm-cm. Prior to mounting in the cell, the porous titanium plaque was degreased in trichloroethylene, pickled in concentrated hydrochloric acid at 50–55° C. for five minutes and then rinsed thoroughly in distilled water. The platinum electroplating solution was a standard commercially available solution containing approximately eight grams of platinum per liter of solution and called Platanex III–LS available from Sel-Rex Corporation. This solution was flowed through the cell such that it first passed through the anodic platinum screen into the area between the opposing anodic and cathodic surfaces, through the porous titanium cathode and then out of the cell. Using this apparatus, the electroplating bath, at a temperature of 82° C., was continuously circulated through the electrodes at a solution flow rate of 265–300 cc. per minute for one hour during which time a 2 inch by 5 inch area of the cathode was plated with platinum at a current density of approximately 10 amperes per square foot of apparent cathode area. At the end of this run about 0.476 gram of platinum was distributed on the porous titanium surface. The platinized titanium was then degreased, pickled and rinsed under the aforesaid conditions and additional platinum was deposited by circulating the electroplating solution at a temperature of 65–78° C. through the electrodes at a solution flow rate of 50 cc. per minute and a current density of approximately 10 amperes per square foot of apparent cathode area. The total amount of platinum deposited during these two consecutive runs was 1.489 grams, the finished electrode having a permeability of 145 millidarcies and a resistivity of 271 micro-ohm-cm. This electrode is designated herein as Anode A.

EXAMPLE II

In carrying out the procedure of this example, a substrate of porous titanium was employed having a mean pore size of about 2.8 microns with a pore size range of 1.5–4 microns and a porous metal porosity of 19.5 percent. The substrate was electrocleaned using a standard cleaning solution, rinsed in distilled water and then assembled as the cathode in a flow through electroplating cell of the type described in Example I above. A 6 normal solution of hydrochloric acid was flowed through the cell as described in Example I, at room temperature followed by continuous washing with a 12 normal hydrochloric acid solution until the evolution of gas was first observed at which time the cell was drained of liquid. Three liters of boiling distilled water were then passed through the cell, the cell drained, and a strike of platinum from a standard electroplating solution containing approximately 12 grams of platinum per liter of solution was applied over a period of 5 minutes at 3 amperes at a flow rate through the cell of electroplating solution of approximately 150 cc. per minute, the current density being 21 amperes per square foot. The titanium substrate was then electroplated for another period of approximately 35 minutes at 1.7 amperes, 1.9 volts, a flow through rate of the electroplating solution of 50–80 cc. per minute and a current density of 12 amperes per square foot. The current was then cut off, the cell drained immediately and the sample rinsed and boiled in distilled water. This electrode is designated herein as Anode B.

EXAMPLE III

The substrate employed was porous titanium having a metal porosity of 26.7 percent and a bubble pressure of 9.5 inches of mercury in the form of a hollow cylinder (3 inches in length and having a ½ inch diameter). The porous titanium cylinder was treated by immersion in various solutions, drawing the solutions through the porous surface by suction. Thus the cylindrical porous titanium substrate was immersed for electrocleaning in a standard cleaning solution followed by immersion in distilled water. The cylinder was then immersed in a 6 normal hydrochloric acid solution at room temperature followed by immersion in a 12 normal hydrochloric acid solution until the evolution of gas was first observed and was then rinsed in boiling, distilled water. The cleaned substrate was next immersed in a warm (about 60–80° C.) platinum electroplating solution containing approximately 15 grams of platinum per liter of solution and was opposed by a platinum anode. Electroplating was carried out for one minute at 30 amperes per square foot and for 19 minutes at 20 amperes per square foot, followed by rinsing of the electroplated surface with distilled water. This electrode is designated herein as Anode C.

EXAMPLE IV

Anode A was mounted as anode 172 in an electrochemical cell of the type illustrated by FIG. 12, the diaphragm 171 separating the anode and cathode compartments being formed of white asbestos. Anode A was connected to the positive pole of a direct current rectifier by means of anode terminus 173 and was opposed by a stainless steel screen 169 connected to the negative pole of the rectifier by means of cathode terminus 174. Aqueous solution containing 90 grams per liter of dissolved sodium chloride was fed to anode compartment 183 at a flow rate of 11 cc. per minute. Propylene was fed to the back of porous platinized titanium Anode A (chamber 182) at a rate of 340 cc. per minute. The cell was operated at a temperature of 110° F., a current density of 140 amperes per square foot for a period of 4 hours. The voltage drop across the cell remained constant during operation and was 4.1 volts. Propylene chlorohydrin forms in the anolyte and passes through the diaphragm 171 into the cathode compartment wherein it is dehydrochlorinated in the alkaline catholyte forming propylene oxide. Effluent gases comprising propylene oxide and cathodic hydrogen exiting from the catholyte by means of outlet 179, were collected and analyzed. Catholyte which also contains dissolved propylene oxide product was withdrawn from the cell by means of outlet 178 and analyzed. Based on the analyses, it was found that the propylene oxide was produced in a selectivity of 61 percent, defined as the ratio of total propylene oxide product to total organic product expressed in percent.

Example V

The electrochemical cell of the type illustrated by FIG. 12 was also operated as described in Example IV except that a dense graphite anode having an average porosity of 20 percent was used in place of Anode A. Aqueous solution containing 87 grams per liter of dissolved sodium chloride was fed to the anode compartment at a flow rate of 15 cc. per minute. Propylene was fed to the back of the graphite anode at a rate of 614 cc. per minute. The cell was operated at a temperature of 130° F., a current density of 140 amperes per square foot for four hours. During this operation the voltage drop across the cell fluctuated between 4.3 and 4.7 volts. Based on an analysis of the gaseous effluent from the cathode compartment and of the catholyte, the propylene oxide product was produced in a selectivity of 55 percent.

A comparison of the results obtained by Examples IV and V each of which was operated at a current density of 140 amperes per square foot, shows that by operating the olefin oxide producing cell using the platinized titanium anode in place of carbon, the cell operated with a significantly lower voltage drop across the cell and, as shown by these data, the power requirements of the cell was lowered by at least 5 percent.

In the following Table II, operating conditions and results of a series of runs are given in which propylene was reacted in a cell of the type illustrated by FIG. 12 except that a fluid impermeable barrier (glass) was positioned between the anode and cathode in place of fluid permeable diaphragm 171 such that anolyte was substantially prevented from reacting in the alkaline catholyte. The cell is further modified to allow for withdrawal of anolyte from the anode compartment and feeding of aqueous solution to the cathode compartment from an external source. In this manner, a separate flow of aqueous medium is maintained in and out of the anode chamber and in and out of the cathode chamber such that the oxygen-containing derivative of the propylene feed is the chlorohydrin which is recovered as such. Following this procedure, run numbers 1–9 of Table II were carried out under the indicated conditions using a porous graphitic carbon anode in runs 1–4, and the above-described cylindrical porous platinized titanium anode, designated as Anode C, in runs 5–9, the propylene being fed to each anode under the pressure indicated to aid diffusion thereof through the porous surface.

TABLE II

| Run number | 1 | 2 | 3 | 4 | 5 | 6 | 7 | 8 | 9 |
|---|---|---|---|---|---|---|---|---|---|
| Anode | Porous carbon | | | | Porous platinized titanium | | | | |
| Operating conditions: | | | | | | | | | |
| Anode voltage, volts | 2.41 | 2.42 | 2.77 | 1.83 | 1.55 | 1.55 | 1.54 | 1.50 | 1.52 |
| Current, amperes | 2.3 | 2.3 | 2.3 | 2.3 | 2.3 | 2.3 | 2.3 | 2.3 | 2.3 |
| Propylene feed rate, cc./min | 100 | 89 | 74 | 79 | 77 | 80 | 82 | 84 | 84 |
| Anodic pressure, mm. Hg | 255–344 | 250–577 | 340–420 | 100–153 | 332–360 | 350–380 | 385–414 | 372–380 | 382–398 |
| Duration, minutes | 177 | 240 | 241 | 240 | 240 | 240 | 240 | 240 | 240 |
| Anolyte | Aqueous sodium chloride solution | | | | | | | | |
| pH: | | | | | | | | | |
| In | 7.7 | 7.7 | 9.2 | 7.9 | 7.7 | 9.8 | 8.3 | 0.7 | 12.6 |
| Out | 1.0 | 0.9 | 0.8 | 1.0 | 1.1 | 0.9 | 1.1 | 0.4 | 4.2 |
| Feed rate, cc./min | 6.5 | 6.2 | 6.4 | 7.4 | 7.1 | 6.6 | 13.1 | 6.6 | 6.7 |
| Cl⁻ concentration, normality: | | | | | | | | | |
| In | | 1.46 | 1.47 | 1.44 | 1.43 | 1.50 | 1.46 | 1.63 | 1.48 |
| Out | 1.42 | 1.44 | 1.42 | 1.45 | 1.47 | 1.49 | 1.48 | 1.61 | 1.49 |
| Temperature, °F | 124 | 124 | 125 | 125 | 124 | 124 | 125 | 125 | 125 |
| Products, percent Faraday's basis: | | | | | | | | | |
| Propylene chlorohydrin: | | | | | | | | | |
| Anolyte [1] | 81 | 76 | 71 | 77 | 74 | 82 | 76 | 78 | 85 |
| Catholyte | 1.5 | 1.5 | [2] | [2] | [2] | [2] | [2] | 1 | [2] |
| Dichloropropane | 10 | 7.0 | 8.1 | 7.2 | 6.4 | 8.3 | 8.7 | 4.9 | 8.9 |
| $CO_2$ | 0.9 | 0.8 | 3.5 | 1.5 | 1.1 | 0.5 | 1.1 | 1.2 | 0.8 |
| $O_2$ | 1.1 | 0.8 | 3.5 | 2.9 | 0.2 | 0.7 | 0.7 | 0.0 | 0.8 |
| $H_2$ | 97 | 96 | 96 | 96 | 101 | 99 | 99 | 88 | 98.4 |
| Other | 0.3 | 0.2 | 0.2 | | | 0.8 | 0.1 | 0.1 | 0.1 |
| Percent conversion | ~10 | 23 | 25 | 26 | 29 | 29 | 30 | 27 | 30 |
| Faradic balance (approximate) | 94 | 87 | 86 | 89 | 82 | 92 | 87 | 85 | 96 |

[1] Average over indicated duration of runs. [2] Less than 0.001.

The data of Table II illustrate that by the method of this invention, an improved method is provided for the manufacture of halohydrin derivatives of olefins, as shown by the fact that the power requirement of the cell as indicated in particular by the anodic voltage was significantly less when using the platinized titanium anodes in place of graphitic carbon.

In the following Table III, operating conditions and results of another series of runs are given in which propylene was reacted in a cell of the type illustrated by FIG. 11 except that the cell was modified as described above to allow for recovery of propylene chlorohydrin as such from the anode compartment by employing a solid barrier of glass between the opposing anodic and cathodic surfaces. In these runs propylene feed was fed directly to the anolyte containing the indicated metal chloride, by means of porous sparge 156 formed of glass. In runs 11 and 12, dense graphite was used as the anode material. In runs 13–15, the above-described porous platinized titanium Anode C was employed as anode 152 and the propylene reactant was fed directly to the anolyte by means of sparge 156 rather than through the porous surface of the anode.

TABLE III

| Run number | 11 | 12 | 13 | 14 | 15 |
|---|---|---|---|---|---|
| Anode | Carbon | | Platinized titanium | | |
| Operating conditions: | | | | | |
| Anode voltage, volts | 2.09 | 2.04 | 1.45 | 1.45 | 1.45 |
| Current, amperes | 2.3 | 2.3 | 2.3 | 2.3 | 2.3 |
| Proplyene feed rate, cc./min | 79 | 77 | 90 | 80 | 78 |
| Anodic pressure, mm. Hg | 245-673 | 291-604 | 243-262 | 248-252 | 238-245 |
| Duration, minutes | 240 | 142 | 240 | 241 | 240 |
| Anolyte | NaCl | KCL | NaCl | NaCl | NaCl |
| pH: | | | | | |
| In | 0.6 | 0.6 | 9.4 | 9.4 | 9.1 |
| Out | 0.4 | 0.4 | 1.0 | 1.0 | 1.0 |
| Feed rate, cc./min | 7.6 | 7.1 | 6.6 | 6.7 | 7.3 |
| $Cl^-$ concentration, normality: | | | | | |
| In | 1.65 | 1.52 | 1.32 | 1.35 | 1.44 |
| Out | 1.65 | 1.04 | 1.33 | 1.37 | 1.66 |
| Temperature, °F | 125 | 125 | 125 | 125 | 125 |
| Products, Faraday's basis: | | | | | |
| Propylene chlorohydrin: | | | | | |
| Anolyte [1] | 68 | 73 | 83 | 81 | 79 |
| Catholyte | ([2]) | ([2]) | | | |
| Dichloropropane | 9.8 | 6.1 | 4.5 | 4.5 | 7.9 |
| $CO_2$ | 2.9 | 2.8 | 4.0 | 4.4 | 7.7 |
| $O_2$ | 3.6 | 2.8 | 0.0 | 0.0 | 0.0 |
| $H_2$ | 97 | 99 | 98 | 99 | 101 |
| Other | 0.2 | 0.1 | | | |
| Percent conversion | 28 | 28 | 41 | 28 | 24 |
| Faradic balance (approximate) | 84 | 85 | 92 | 90 | 95 |

[1] Average over indicated duration of runs.   [2] Less than 0.001.

The data of Table III further demonstrate that in operating the cell to produce and recover halohydrin derivatives of the olefin by feeding the olefin directly to the anolyte through a sparge, a marked reduction in the power requirement of the cell is also realized by using platinized titanium as the reactive anodic surface. This is indicated, as in the other tabulated data herein, by comparison of the half cell or anodic voltages since the latter are not substantially affected by variables which do affect the cell potential such as the type and characteristics of the diaphragm, the cathode overvoltage and the contact potentials.

In the following Table IV, operating conditions are given for runs 16–20 in which propylene was converted to propylene oxide within the electrochemical cell. In runs 16 and 17, a cell of the type illustrated by FIG. 12 was employed in which anode 172 was Anode B described above under Example II, and diaphragm 171 in association with cathodic screen 169 was liquid permeable white woven asbestos, the propylene being fed to chamber 182 and diffusing through the pores of the anodic surface. The operation of runs 18–20 was carried out in a cell of the type illustrated by FIG. 11 with introduction of the propylene reactant to the anolyte through sparge 156. In run 18, anode 152 was formed of commercially pure nonporous titanium having a thickness of 63 mils and a platinum layer electroplated thereon in a thickness of 80 micro-inches, diaphragm 151 was formed of liquid permeable polypropylene and sparge 156 was formed of polyethylene. In runs 19 and 20, anode 152 was formed of a core of nonporous titanium having a coating thereon of platinum-iridium alloy (70 and 30 weight percent of platinum and iridium, respectively), the coating having a thickness of 1 micron and being of the low surface area type. In run 19, the diaphragm and the sparge were each formed of polyethylene. In run 20, white asbestos paper was used as the diaphragm and the sparge was formed of porous titanium. These runs were conducted such that the flow of anolyte containing propylene chlorohydrin formed in the anolyte was maintained from the anode compartment through the fluid permeable diaphragm into the cathode compartment wherein the chlorohydrin was converted to propylene oxide. In Table IV the yields of the principal products, namely, propylene oxide and dichloropropane, are expressed on the basis of Faraday's.

TABLE IV

| Run number | 16 | 17 | 18 | 19 | 20 |
|---|---|---|---|---|---|
| Operating conditions: | | | | | |
| Temperature, °F | 125 | 125 | 125 | 125 | 125 |
| Anode voltage, volts | 1.60 | 1.56 | 1.55 | 1.58 | 1.61 |
| Current density, amperes/sq. ft | 70 | 70 | 70 | 50 | 70 |
| Propylene flow rate, cc./min | 330 | 300 | 240 | 400 | 400 |
| Aqueous medium: | | | | | |
| Electrolyte | NaCl | NaCl | NaCl | KCl | KCl |
| Concentration, normality | 1.36 | 1.48 | 1.52 | 0.70 | 0.68 |
| Flow rate, cc./min | 35 | 35 | 36 | 38 | 36 |
| pH in | 10.3 | 10.0 | 8 | 10.8 | 10.8 |
| pH out | 12.8 | 12.4 | 12.4 | 12.4 | 12.3 |
| Duration, hours | 4 | 4 | 3 | 4 | 4 |
| Principal products, percent Faraday's basis: | | | | | |
| Propylene oxide | 86.2 | 86.5 | 76.7 | 77.1 | 83.6 |
| Dichloropropane | 10.6 | 11.1 | 10.7 | 7.5 | 6.6 |

Run 21 of the following Table V illustrates still another advantage of the method of this invention. The run was carried out in a cell of the type illustrated by FIG. 11, employing a solid platinized titanium anode 152 having a platinum coating thereon of the high surface area type and having a thickness of 75 micro-inches. Sparge 156 was formed of polyethylene by means of which propyene was fed directly to the anolyte. Fluid permeable diaphragm 151 was formed of woven, white asbestos, and the flow of aqueous medium containing potassium chloride was maintained from anode compartment 163 through the diaphragm into the cathode compartment 164 such that the propylene chlorohydrin formed in the anolyte was dehydrochlorinated in the cathoylte to form propylene oxide. Aqueous effluent containing the oxide was withdrawn by means of outlet 161 and then passed through a stripping zone operated under the temperature and pressure conditions given in Table V to recover propylene oxide. The aqueous medium was then passed through an activated charcoal filter bed (2 cm. thick and 18.5 cm. in diameter), and recycled to the anode compartment 163. In the following Table V, run periods (1), (2) and (3) correspond to those periods during which product was collected and analyzed, the length of each of such periods being designated as the balance period each of which was begun after the indicated total number of hours of on stream operation of the cell. For example, run period (2) was begun after the cell had been on operation for 25 hours and the duration of (2) was 4 hours during which 82.6 percent propylene oxide was produced on the basis of Faradays.

TABLE V

|  | Run No. 21 | | |
| --- | --- | --- | --- |
| Run period | (1) | (2) | (3) |
| Operating conditions: | | | |
| Temperature, °F | 125 | 125 | 125 |
| Cell voltage, volts | 3.31 | 3.35 | 3.42 |
| Anode voltage, volts | 1.54 | 1.56 | 1.60 |
| Current intensity, amperes | 10.8 | 10.8 | 10.8 |
| Propylene flow rate, cc./min | 410 | 410 | 410 |
| Aqueous medium: | | | |
| Electrolyte | KCl | KCl | KCl |
| Concentration, normality | 1.22 | 1.00 | 1 |
| Flow rate, cc./min | 33 | 33 | 33 |
| pH | 10 | 10.2 | 10.2 |
| pH out | 12.8 | 12.7 | 12.6 |
| Duration: | | | |
| Total hours on stream | 1 | 25 | 49 |
| Balance period, hours | 3.8 | 4 | 4.3 |
| Recycle rate, No. cycles/day | 16 | 16 | 16 |
| Stripper temperature, °C | 32 | 32 | 32 |
| Stripper pressure, mm. Hg | 34 | 34 | 33 |
| Principal products, percent Faraday's basis: | | | |
| Propylene oxide | 81.7 | 82.6 | 81.5 |
| Dichloropropane | 8.9 | 9.1 | 10.8 |
| Total hydrogen efficiency | 101 | 99 | 97 |

The results of Table V show that during the recycle operation, the voltage and yield of propylene oxide remained substantially constant which are further advantages realized in employing the electrodes of this invention.

In a specific illustration of operation of the cell of FIG. 5 of the accompanying drawings, anode unit 5 is fitted with twenty-nine anodes 2 each of which has inner chamber 11 enclosed by side walls 12 which have a thickness of 0.375 inch and are formed of porous platinized titanium prepared as described above for Electrode A, and by top member 13 which is formed of solid titanium. Base 14 of each of anodes 2 is also formed of soild titanium and is secured within the slots of current distributing plate 35 which is made of electrolytic grade copper, and of anodizable layer 36 which is formed of titanium. Cathodic unit 10 is mounted on unit 5 such that anodes 2 are in alternating spaced relationship to tubular cathodes 80 of which there are twenty-eight, the outer surfaces of each of the end anodes being oposed by half-cathodes 79. The foraminous surfaces of tubular cathodes 80, the peripheral foraminous wall of the inner cell chamber including vertical side walls 82 and 101 and the upper and lower enclosures of peripheral cathode compartment 92 including upper sections 96 and 97 and lower sections 98 and 99 are formed of a screen (wire steel cloth). A diaphragm 103 of asbestos fiber is deposited on the outer surfaces of cathode tubes 80, on the inner surfaces of side walls 82 and half-cathodes 79, and on the upper and lower surfaces, respectively, of the upper and lower foraminous enclosures of the peripheral cathode compartment 92. The gap between the outer surfaces of anodes 2 and cathodes 80 is approximately 0.25 inch, the gap between the outer sides of the end anodes and half cathodes 79 being about 0.375 inch. Brine containing 8.5 weight percent of dissolved sodium chloride in water and having a pH of 11 is charged to inlets 112 within dome 109 at a rate of about 2400 gallons per hours. The brine flows downwardly by gravity until the desired level within the inner cell chamber is reached which level is observed by means of a brine level indicator scale on a manometer (not shown) which is external to the cell and in fluid communication with the brine within the inner cell chamber. The brine level is maintained above the top level of anodes 2. The aqueous medium as charged to the cell is at a temperature of about 100° F., and the temperature of the aqueous medium as it exits from the cell through outlet 118 is about 125° F., the increase in temperature being caused mainly by the potential drop across the cell. The cell is operated at a substantially atmospheric pressure. A refinery stream of propylene rich gas containing propylene and propane is used as the olefinic feed and is charged to olefin inlet 31 at a rate of 4.15 pound-moles per hour. The gaseous rectant is introduced at a slight back pressure of about 5–6 pounds per square inch gauge to obtain uniform diffusion through the pores of side walls 12 of anodes 2. A source of direct current is supplied to the anode terminals and cathode terminals at an intensity of 54,000 ampers. The cell therefore is operating at a current density of 100 amperes per square foot of apparent electrode surface. The resulting potential drop across the cell terminals is 3.6 volts. Propylene chlorohydrin is produced in the anolyte which is at an acid pH and is circulated to cathode compartments 85 within cathodes 80, and peripheral cathode compartment 92, by the direction of flow of the aqueous medium, passing through the diaphragh on the cathodic foraminous surfaces. The propylene chlorohydrin reacts in the cathods vicinity which is at an alkaline pH to form propylene oxide. The acidity of the anolyte and the alkalinity of the catholyte are maintained by having the diaphragm between the anode and cathode compartments. Under these conditions of operation, dichloropropane also is formed in the anode comparement. The anode gases comprisng dichloropropane, unreacted propylene, propane and water vapor, pass upwardly into the free space above the level of the anolyte and exit from the cell by means of outlet 114 within dome 109, the dichloropropane and propylene exiting at a rate of about 0.201 and 0.109 pound-moles per hour, respectively. In addition to the propylene oxide, hydrogen gas is also generated within the cathode compartment and is substantially prevented from passing into the gaseous anode effluent stream by the diaphragm on the foraminous cathodic surfaces. The cathode gas effluent containing volatilized propylene oxide and hydrogen are rapidly discharged from the foraminous cathodic surfaces by the passageways provided by apertures 94 in perforated wall 93 and exit from peripheral compartment 91. Hydrogen and volatilized propylene oxide product pass from the compartment 91 at a rate of about 2.21 and 0.403 pound-moles per hour, respectively. The aqueous electrolyte medium is discharged from peripheral compartment 91 by means of outlet 118. The rate of flow of the propylene oxide contained in the brine solution as it exits from the cell on a pound per hour basis, is about 92.5. After treatment to separate dissolved propylene oxide, the brine is further treated as required to remove any sludge, adjust the pH, etc., and is recycled to the cell. On the basis of current input, the faradic balance is 89.3 percent propylene oxide, 8.0 percent dichloropropane, the remainder being 0.7, 0.5, 0.5 and 1.0 percent, respectively, of propylene glycol, oxygen, carbon dioxide and high boilers. Under the above conditions, the product output of the cell is about 2780 pounds of propylene oxide per day. On the other hand, a cell having the same floor area but equipped with graphitic anodes in place of the platinized titanium anodes, has a significantly lower product output. For example, when such a cell is operated at the same current density of 100 amperes per square foot, the maximum total amperage is 31,000 amperes and the output of propylene oxide is about 1610 pounds per day which is approximately 55 percent less than the daily propylene oxide output of the cell equipped with the platinized titanium anodes.

Although the above examples are specific to the use of propylene as the olefin reactant, it is to be understood that other olefins including those which are normally gaseous, liquid or solid may be employed. When solid, the olefin is charged to the vicinity of the anode dissolved or dispersed in any suitable liquid solvent such as a paraffinic aromatic hydrocarbon or mixtures thereof including petroleum fractions such as hydrogenated kerosene, etc. Suitable types of olefins which may be used are: the alkenes of the homologous series $C_nH_{2n}$ wherein $n$ is an integer from 2 to about 12 such as ethylene, propylene, butene, pentene, hexene, heptene ... dodecene, etc.; olefins in which the double bond is in a non-terminal position such as 2-butene, 2-pentene, etc.; branched olefins such as isobutene, isopentene, 4-ethyl-2-hexene, as well as branched compounds in which the double bond is in the side chain such as 2-methenepentane and alkenyl compounds; and cyclic olefins such as cyclopentene, cyclohexene, etc. Polyolefins are also useful as feed to the vicinity of the anode and include those containing isolated, cumulative or conjugated double bonds such as diallyl, allene, butadiene, isoprene and 2,3-dimethylbutadiene. In addition to the above, olefins substituted with aryl and halogen groups also may be used, typical examples of which are styrene, stilbene and allyl chloride.

In addition to sodium and potassium chlorides, the metal halide electrolyte may be any other water soluble compound whose corresponding hydroxide is also water soluble. Usually employed are the metal halides of the alkali metals including sodium, potassium and lithium halides, although alkaline earth metal halides are suitable as well as mixed electrolytes. The chlorides are usually employed because of their greater availability. However, in other instances the choice of halide will be governed by the ultimate use of the dihalo derivative of the olefin which is formed in varying quantities at the anode. Thus, when it is desired to recover the dihalo by-product as the dichloro compound, metal chloride is used; when the dibromo derivative is desired, a metal bromide is used, etc. When the method of this invention is carried out so as to recover the halohydrin derivative of the olefin as the halohydrin, in place of the metal halide the aqueous medium may contain a hydrogen halide as the electrolyte such as hydrochloric acid, in which event the halohydrin may be converted to the oxide in a step external to the electrochemical cell, as desired.

Various other modifications of the method and apparatus of this invention may become apparent to those skilled in the art from the teachings of this invention without departing from the scope thereof.

What is claimed is:

1. In an electrochemical cell having an outer cell casing and an inner cell chamber for containing aqueous electrolyte and within which there is at least one anodic electrode opposed by at least one cathodic electrode, said cell being further provided with inlet means for supplying an aqueous electrolyte medium to said inner cell chamber between the opposing anodic and cathodic electrodes, an anode assembly comprising in combination current distributing means disposed below said inner cell chamber and having thereon a layer of titanium, the upper surface of said layer of titanium defining the floor of said inner cell chamber, and at least one anodic electrode member extending upwardly from said layer of titanium into the inner cell chamber in opposing relationship to said cathodic electrode, said anodic electrode member comprising a reactive anodic surface in the form of a vertical blade formed of titanium and having an outer coating of platinum at least on that portion of titanium and having an outer coating of platinum at least on that portion which opposes the cathodic electrode.

2. The cell of claim 1 in which the anodic electrode is in the form of a blade having an inner chamber, an open lower end, a closed upper end and vertical side walls, at least a portion of said vertical side walls which extends above the anodizable metal layer being porous, said cell being further provided with fluid distributing means for introducing a fluid reactant to the inner chamber of said anodic electrode, said inner chamber of the anodic electrode being in fluid communication with the inner cell chamber by means of said porous portion of the anodic electrode.

3. The cell of claim 1 in which said inlet means for feeding aqueous electrolyte medium to the inner cell chamber is formed of an anodizable metal and is positioned in the said anode assembly of the cell and extends through said current distributing means and anodizable metal layer.

4. The cell of claim 1 which is further provided with means for bringing a fluid reactant into contact with aqueous electrolyte medium in the vicinity of said anodic electrode.

5. The cell of claim 1 in which the said anodic electrode is in the form of a series of contiguous tubes.

6. The cell of claim 1 in which the said anodic electrode is in the form of a vertically positioned hollow member at least a portion of the vertical walls of the hollow member which extends above said layer of anodizable metal being porous.

7. The cell of claim 1 in which said reactive surface of said anodic electrode is in the form of a solid blade.

References Cited

UNITED STATES PATENTS

| | | | |
|---|---|---|---|
| 3,242,059 | 3/1966 | Cottam et al. | 204—266 |
| 3,288,692 | 11/1966 | Leduc | 204—257 |
| 3,096,272 | 7/1963 | Beer | 204—290 |
| 1,281,085 | 10/1918 | Shoeld | 204—257 |
| 3,335,074 | 8/1967 | Wright et al. | 204—56 |
| 3,177,131 | 4/1965 | Angell et al. | 204—128 |
| 2,987,463 | 6/1961 | Baker et al. | 204—283 |
| 2,928,776 | 3/1960 | Puppolo | 204—56 |
| 2,955,999 | 10/1960 | Tirrell | 204—180 |

FOREIGN PATENTS

| | | | |
|---|---|---|---|
| 2,667 | 5/1966 | Repub. of South Africa | 204—290 |

JOHN H. MACK, Primary Examiner

R. L. ANDREWS, Assistant Examiner

U.S. Cl. X.R.

204—266, 283, 290